(12) United States Patent
Hiji et al.

(10) Patent No.: US 7,465,480 B2
(45) Date of Patent: Dec. 16, 2008

(54) POLYMER/CHOLESTERIC LIQUID CRYSTAL DISPERSION, METHOD OF PRODUCING THE SAME LIQUID CRYSTAL DISPLAY ELEMENT USING THE SAME

(75) Inventors: Naoki Hiji, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 717 days.

(21) Appl. No.: 10/999,001

(22) Filed: Nov. 30, 2004

(65) Prior Publication Data
US 2005/0244590 A1  Nov. 3, 2005

(30) Foreign Application Priority Data
Apr. 30, 2004  (JP) .............................. 2004-135485

(51) Int. Cl.
*C09K 19/00* (2006.01)
*C09K 19/52* (2006.01)

(52) U.S. Cl. .......................... 428/1.2; 428/1.1; 430/20; 252/299.01

(58) Field of Classification Search .................. 428/1.2, 428/1.1; 430/20; 252/299.01
See application file for complete search history.

(56) References Cited

U.S. PATENT DOCUMENTS
6,887,534 B2 *  5/2005  Nakata et al. ................. 428/1.2

FOREIGN PATENT DOCUMENTS
JP  A-05-080303  4/1993
JP  A-06-160817  6/1994

* cited by examiner

*Primary Examiner*—Geraldina Visconti
(74) *Attorney, Agent, or Firm*—Morgan, Lewis & Bockius LLP

(57) ABSTRACT

A polymer/cholesteric liquid crystal dispersion including a cholesteric liquid crystal dispersed in a polymer. A perpendicular aligning component that aligns the cholesteric liquid crystal in a direction perpendicular to the boundary between the cholesteric liquid crystal and the polymer is provided at least one of at the boundary between the cholesteric liquid crystal and the polymer and in the polymer.

18 Claims, 10 Drawing Sheets

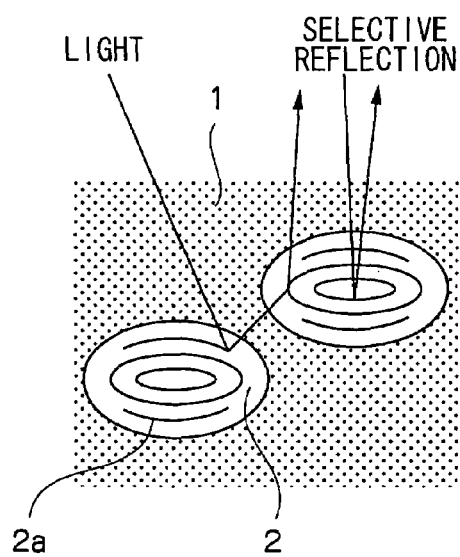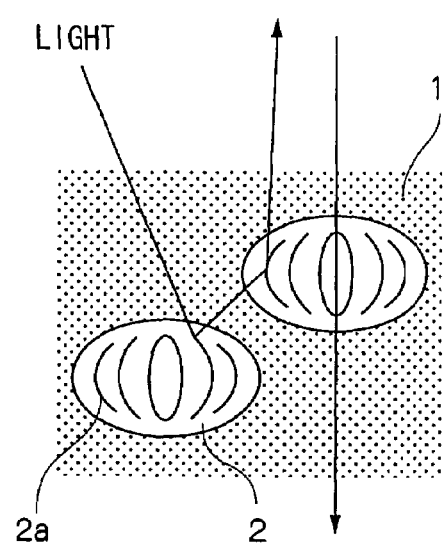
P ORIENTATION
FIG.3A
F ORIENTATION
FIG.3B

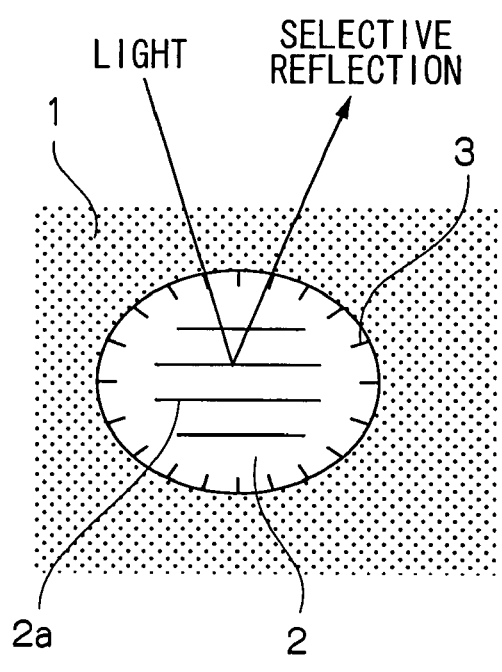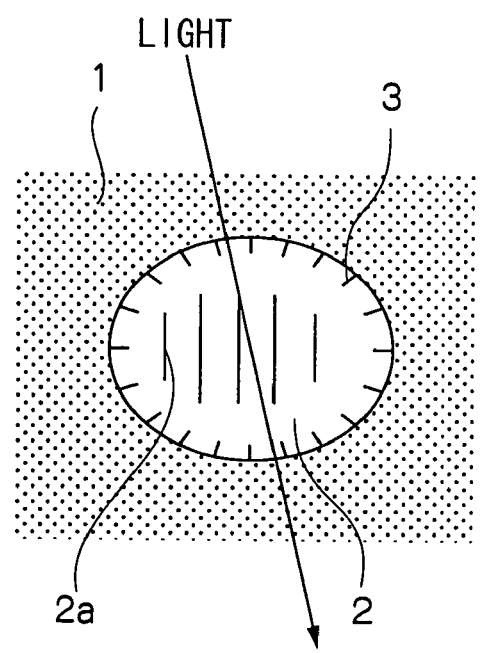
P ORIENTATION
FIG.4A
F ORIENTATION
FIG.4B

POLYMER/CHOLESTERIC LIQUID CRYSTAL DISPERSION, METHOD OF PRODUCING THE SAME LIQUID CRYSTAL DISPLAY ELEMENT USING THE SAME

CROSS-REFERENCE TO RELATED APPLICATION

This application claims priority under 35USC 119 from Japanese Patent Application No. 2004-135485, the disclosure of which is incorporated by reference herein.

BACKGROUND OF THE INVENTION

1. Field of the Invention

The present invention relates to a polymer/cholesteric liquid crystal dispersion which is utilized for display elements, image/information recording elements and spatial light modulators, to a method of producing the dispersion and to a liquid crystal display element utilizing the dispersion.

2. Description of the Related Art

A cholesteric liquid crystal display element has, for example, the characteristics that it has a memory storing ability which can retain a display without any power source, it has the ability to obtain a bright display because no polarizing plate is used, and it enables color displaying without using a color filter. Attention has been therefore focused on such display elements in recent years (see, for example, Japanese Patent Application Laid-Open (JP-A) No. 05-080303).

A cholesteric liquid crystal, in particular, is made of rod-shaped molecules oriented spirally and reflects interference light having a wavelength which corresponds to the spiral pitch (called selective reflection). It therefore has the characteristics that bright color display is possible without using any color filter by designing the spiral pitch to have a length corresponding to the wavelength of a red color, a green color or a blue color.

Cholesteric liquid crystal sealed into a cell constituted by a pair of substrates provided with electrodes is known to take any of three types of oriented states: planar (P) orientation, focal conic (F) orientation and homeotropic (H) orientation as shown in FIG. 8A to FIG. 8C. In the figures, reference numeral 2 represents cholesteric liquid crystal, 21 and 22 represent a pair of substrates, and 11 and 12 represent electrodes. The P orientation is a state in which the spiral axis is oriented substantially perpendicular to the surface of the substrate and provides selective reflection. The F orientation is a state in which the spiral axis is oriented substantially parallel to the surface of the substrate, and light is transmitted in this state. The H orientation is an oriented state that appears when a sufficiently high voltage is applied between the pair of electrodes. In this state, the spiral is loosened, molecules are oriented perpendicular to the surface of the substrate, and light is transmitted. These three oriented states can be switched among each other by applying voltage between the electrodes.

Accordingly, if a light absorber having a color such as a black color is disposed on the backside of the cell, it is possible to obtain a bright display colored with the selective reflection color during the P orientation and a dark display colored with the black color of the light absorber during the F or H orientation. Among the above orientation forms, both the P orientation and the F orientation can exist stably without using any power source. The utilization of this property makes it possible to attain a memory display in which a display is maintained without using any power source.

On the other hand, a structure is known in which a polymer/cholesteric liquid crystal dispersion 4 obtained by dispersing a cholesteric liquid crystal 2 as particles in a polymer 1 is sandwiched between a pair of substrates 21 and 22 having electrodes 11 and 12, as shown in FIG. 9, instead of sealing the cholesteric liquid crystal directly between a pair of substrates having electrodes.

In this case as well, the above display principle may be similarly utilized. The polymer/cholesteric liquid crystal dispersion is more resistant than ordinary liquid crystal cells to stresses applied from the outside. Therefore, the dispersion is not only resistant to the breakdown of a stored image but can also be apparently handled as a solid. As a result, there are advantages in that the polymer/cholesteric liquid crystal dispersion can be handled in, for example, a production process more easily than a liquid cholesteric liquid crystal and can be laminated on other functional films such as an optical conductor.

As shown in FIG. 10, however, the reflection spectrum of the polymer/cholesteric liquid crystal dispersion is largely different from that of a liquid crystal cell, and the polymer/cholesteric liquid crystal dispersion has the following problems: (1) the spectrum of the polymer/cholesteric liquid crystal dispersion at the time of light reflection has significantly larger short-wavelength components than those of a liquid crystal cell, whereby only a color display having low color purity can be obtained and (2) the spectrum at the time of a dark display has large short-wavelength components, whereby only a display having a low contrast is obtained. There is also a problem in that (3) although a liquid crystal cell has a relatively stable reflectance at the time of a dark display (dark reflectance) over time, the polymer/cholesteric liquid crystal dispersion has a strong tendency toward an increase in this reflectance, which is accompanied by a display being made lighter in color over time.

The above problems are characteristics found to be common to several methods of producing the polymer/cholesteric liquid crystal dispersion, such as a cholesteric liquid crystal microcapsule using a gelatin and gum arabic as its wall material, a cholesteric liquid crystal microcapsule using a polyurethane resin as its wall material, and a polymer/cholesteric liquid crystal dispersion obtained by dispersing cholesteric liquid crystals in an aqueous solution of a polyvinyl alcohol resin, followed by drying.

Conventionally, the problems (1) and (2) have been caused by the superpositioning of boundary light scattering caused by a difference in refractive index between the polymer and the liquid crystal and have been considered to be unavoidable in polymer/cholesteric liquid crystal dispersions containing numerous cholesteric liquid crystal droplets in the direction of the film thickness. For this reason, as a measure for solving this problem, a method is disclosed, for example, in which a polymer/cholesteric liquid crystal dispersion is formed so as to contain only one liquid crystal droplet in the direction of the film thickness to decrease the influence of light scattering, in JP-A No. 6-160817.

Although contrast is certainly improved according to this method disclosed in JP-A No. 6-160817, the method has a problem in that the area percentage of the cholesteric liquid crystal is reduced, whereby reflectance is reduced. The problem (3) cannot be explained by interfacial light scattering, and neither the cause of nor a preventive measure for the problem has been known.

SUMMARY OF THE INVENTION

The present invention has been made in view of the above described circumstances and provides a polymer/cholesteric liquid crystal dispersion superior in color purity, display contrast and the stability of display quality over time by reducing the effect of the curvature of a polymer wall. The invention further provides a method of producing the dispersion and a liquid crystal display element using this dispersion.

A first aspect of the invention is to provide a polymer/cholesteric liquid crystal dispersion comprising a cholesteric liquid crystal dispersed in a polymer. A perpendicular aligning component that aligns the cholesteric liquid crystal in a direction perpendicular to a boundary between the cholesteric liquid crystal and the polymer is provided at feast one of at the boundary between the cholesteric liquid crystal and the polymer and in the polymer.

A second aspect of the present invention is to provide a method of producing a polymer/cholesteric liquid crystal dispersion. The method comprises: dispersing in water a mixed solution of a cholesteric liquid crystal, a polyvalent isocyanate, a perpendicular aligning component precursor comprising, in a molecule, a functional group which causes an addition reaction with the polyvalent isocyanate and at least one selected from an alkyl group and an alkyl halide group; and polymerizing the polyvalent isocyanate to form a polymer so as to microcapsulate the cholesteric liquid crystal by using the polymer as a wall material.

A third aspect of the present invention is to provide a liquid crystal display element comprising a pair of electrodes and the polymer/cholesteric liquid crystal dispersion of the first aspect sandwiched between the pair of electrodes.

The invention can provide a polymer/cholesteric liquid crystal dispersion superior in color purity, display contrast and the stability of display quality over time by reducing the effect of the curvature of the polymer wall, a method of producing the dispersion and a liquid crystal display element using this dispersion.

BRIEF DESCRIPTION OF THE DRAWINGS

FIGS. 3A and 3B are the schematic structural views of a conventional polymer/cholesteric liquid crystal dispersion.

FIGS. 4A and 4B are schematic structural views conceptually illustrating one example of a polymer/cholesteric liquid crystal dispersion of the present invention.

DETAILED DESCRIPTION OF THE INVENTION

The present invention will be explained in detail.

There may be a possibility that the above-described problems are caused not by the interfacial light scattering, which has conventionally been regarded as the cause of the problems. The polymer/cholesteric liquid crystal dispersion of the invention has been developed based on the assumption in that the conventional problems are caused by the force limiting the orientation at the boundary between the polymer and the cholesteric liquid crystal.

The orientation regulating force at the boundary between the polymer and the cholesteric liquid crystal will be explained hereinbelow.

Figure 1A:
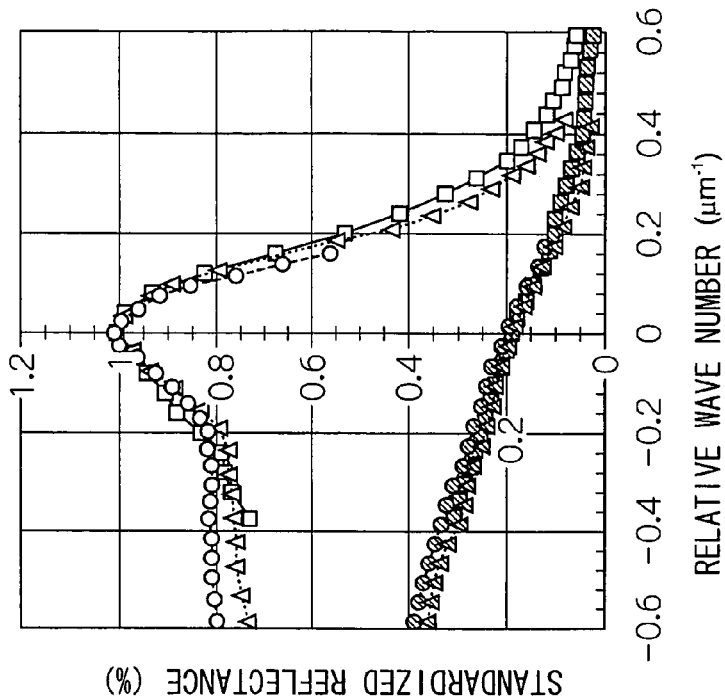
FIGS. 1A and 1B are views illustrating the reflection spectrum of three conventional polymer/cholesteric liquid crystal dispersions having different selective reflection wavelength.
Figure 1B:
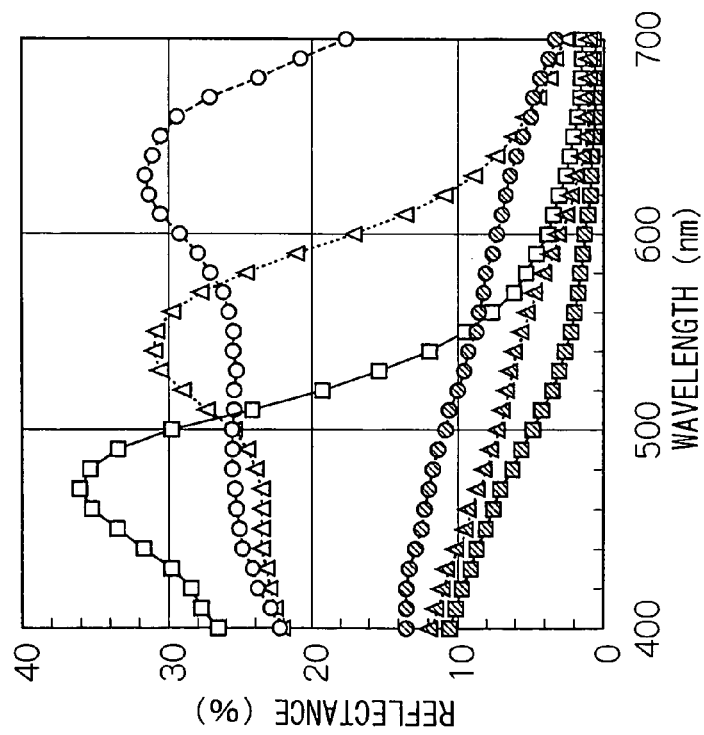

First, the reflection spectrums of three polymer/cholesteric liquid crystal dispersions having different selective reflection wavelength at the time of a bright display and at the time of a dark display are shown in FIG. 1A. In FIG. 1B, the abscissa of FIG. 1A is converted into a wave number (inverse number of wavelength) and the curves are shifted so that the peaks of the reflection spectrums overlap on each other. This scale conversion leads to the result that the reflection spectrums substantially overlap on each other both at the time of a bright display and at the time of a dark display irrespective of selective reflection wavelength.

A difference between a refractive index of the polymer and that of the liquid crystal is not substantially changed in this experiment. Therefore, if a difference in refractive indexes were the cause of the problems regarding the short-wavelength region of a reflection spectrum at the time of a bright display and the cause of a reflection spectrum at the time of a dark display, selective reflection wavelength dependency would not be exhibited. In spite of that, FIG. 1B shows contrary results, which suggest that the above phenomenon is caused not by the interfacial light scattering but by selective reflection.

Figure 2:
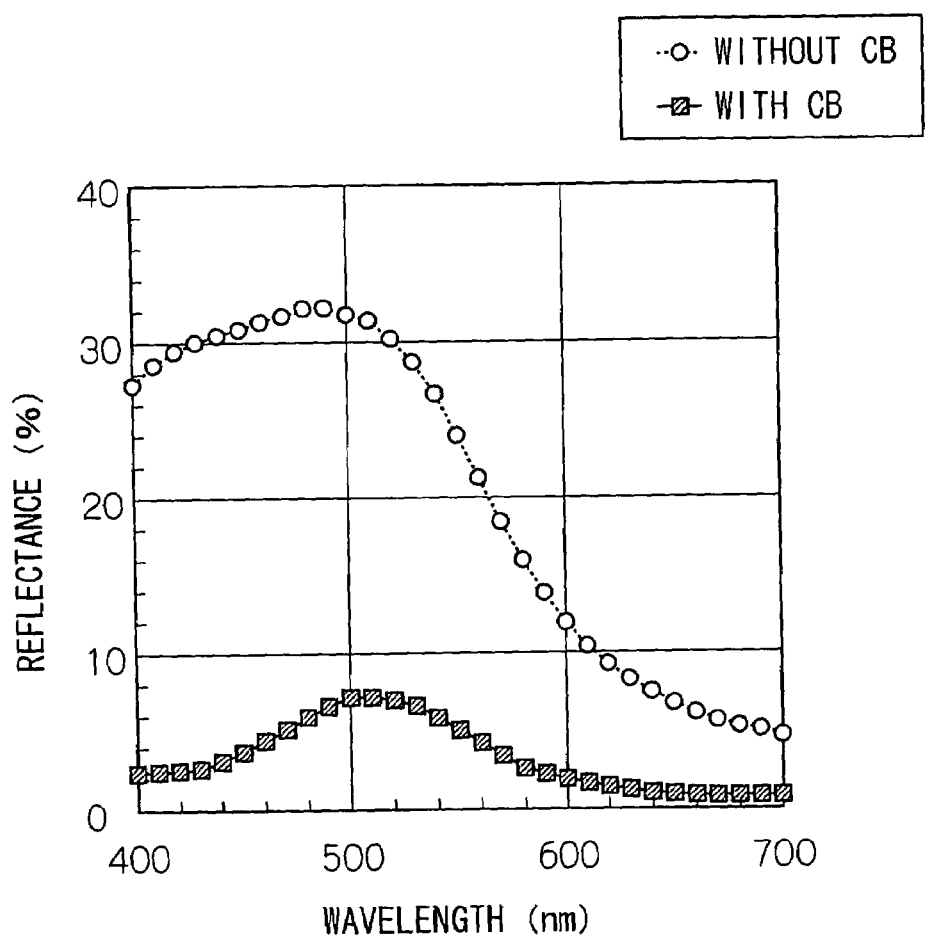
FIG. 2 is the reflection spectrum of a conventional polymer/cholesteric liquid crystal dispersion obtained by adding a dye in a polymer.

As another experiment, a spectrum at the time of a bright display when the polymer/cholesteric liquid crystal dispersion having a selective reflection wavelength of 510 nm is colored in a black color by adding a small amount of carbon black (CB) in the polymer of the dispersion is shown in FIG. 2. A reduction in reflectance is larger in a short-wavelength region than in a selective reflection wavelength. It is suggested from this result that the optical path from the incidence of external light to the polymer/cholesteric liquid crystal dispersion to the emergence of the light after reflection is longer in the case of the short-wavelength component than in the case of the selective reflection wavelength.

Also, polymers, such as a gelatin, polyurethane and polyvinyl alcohol, which have been used for conventional polymer/cholesteric liquid crystal dispersions all have the horizontal orientation ability of aligning a liquid crystal molecule, which is in contact with the polymer, in a direction parallel to the boundary between the polymer and the liquid crystal molecule. Therefore, the cholesteric liquid crystal layer is considered to be oriented along the curvature of a polymer wall both at the time of P orientation and at the time of F orientation as shown in FIGS. 3A and 3B. In fact, when a cholesteric liquid crystal microcapsule is observed under an orthogonal polarizer, a cross pattern is frequently observed to thereby confirm that the cholesteric liquid crystal layer is formed in the shape of concentrically spherical shell in parallel to the microcapsule wall.

In view of the considerations so far, the above-described problems can be attributed to the following mechanism: incident light is selectively reflected by the cholesteric liquid crystal layer bent along the curvature of the polymer wall among the polymer/cholesteric liquid crystal dispersion layers, and the reflected light is again selectively reflected by another bent cholesteric liquid crystal layer and emitted externally. The selective reflection is a kind of Bragg reflection. In the case of Bragg reflection, the wavelength of reflected light is more shifted to the short-wavelength side as incident angle is increased. When incident light from the outside is emitted externally after plural selective reflections, the incident angle of light with the cholesteric spiral axis is more increased than in the case of emitting light by single selective reflection. Therefore, the spectrum of multi-reflected light appears in the wavelength range shorter than the original selective reflection to some degree.

This is considered to be the reason why the spectrum is unchanged in the scale conversion of wavelength, and the reason why the optical path for the short-wavelength region is longer than for the selective reflection wavelength. Hence, this can be the cause of the reduction in chromaticness and contrast. Also, in the polymer/cholesteric liquid crystal dispersion, the area of the interface between the polymer and the cholesteric liquid crystal is incomparably larger than that of a liquid crystal cell. Therefore, it is considered that the influence of orientation regulating force is increased, and this can be a cause of the increase in dark reflectance over time.

In view of the above studies, a method of reducing the effect of the curvature of the polymer wall is effective as a measure for solving the above-described problems and it is therefore effective to reduce the orientation regulating force. The cholesteric liquid crystal layer is by nature most stable when extended straight like a plate spring. Therefore, if the orientation regulating force were reduced, unbent P orientation and F orientation states free from the influence of the polymer wall as shown in FIGS. 4A and 4B would be obtained.

In the polymer/cholesteric liquid crystal dispersion, there are two origins of the orientation regulating force and one of these origins is the surface energy of the polymer. It is known that the polymers used conventionally have high surface energy and the surface of a material having high surface energy provides horizontal orientation ability. The other one is horizontal orientation force provided inevitably to the polymer by the stresses developed in processes such as solvent-drying, polymerization, crosslinking, heating and cooling because the polymer which separates neighboring liquid crystal droplets from each other generally has a thickness as very low as of the order of submicron. In either reasoning, the polymer has orientation regulating force with horizontal orientation ability.

In the polymer/cholesteric liquid crystal dispersion of the present invention, a perpendicular aligning component is introduced at the boundary between the cholesteric liquid crystal and the polymer or in the polymer to offset the horizontal orientation ability which the polymer originally possesses by vertical orientation ability obtained by the introduction of the perpendicular aligning component, whereby the orientation regulating force can be weakened. This allows an unbent and straight cholesteric liquid crystal layer as shown in FIGS. 4A and 4B to exist and color purity and display contrast can be improved. Also, because the orientation regulating force is weak, liquid crystal molecules which are in contact with the polymer are reduced in energy difference regardless of the direction of the orientation of these liquid crystal molecules and therefore, the P orientation and the F orientation are both stable over time.

FIGS. 3A and 3B are the schematic structural views conceptually showing one embodiment of a conventional polymer/cholesteric liquid crystal dispersion; and FIGS. 4A and 4B are schematic structural views conceptually showing one embodiment of a polymer/cholesteric liquid crystal dispersion according to the invention. FIGS. 3A and 4A show P orientation; and FIGS. 3B and 4B show F orientation. In these figures, 1 represents a polymer, 2 represents a cholesteric liquid crystal, 2a represents a cholesteric liquid crystal layer in the cholesteric liquid crystal and 3 represents a perpendicular aligning component. However, the perpendicular aligning component 3 is merely shown conceptually. As will be explained later, when providing vertical orientation ability only by the effect of low surface energy, it is unnecessary that the perpendicular aligning component 3 protrudes from the interface and the component may exist inside of the polymer 2.

As mentioned above, the perpendicular aligning component in the polymer/cholesteric liquid crystal dispersion is one which provides the vertical orientation ability to the polymer, namely one which has the ability to orient the cholesteric liquid crystal in a direction perpendicular to the boundary between the cholesteric liquid crystal and the polymer. The vertical orientation ability of this component is offset by the horizontal orientation ability which the polymer originally has, with the result that the orientation of the liquid crystal molecule at the boundary is horizontal orientation reduced in orientation regulating force or vertical orientation reduced in orientation regulating force.

This vertical orientation ability can be attributed to, for example, the effect of low surface energy and exclusive volume effect as the mechanisms. The perpendicular aligning component provides the vertical orientation ability to the polymer by either one or both of these mechanisms. For this reason, the perpendicular aligning component functions in the case of existing not only at the boundary between the cholesteric liquid crystal and the polymer but also in the case of existing within the polymer.

As the perpendicular aligning component providing vertical orientation ability to the polymer, it is preferable to utilize at least one of a silicon atom, a fluorine atom, an alkyl group and an alkyl halide group. The liquid crystal molecule has a rod shape and is provided with a group, such as a benzene ring having a high surface energy, in the center and a group, such as an alkyl group having low surface energy, at the terminal. Therefore, the liquid crystal molecule is oriented perpendicular at the boundary with a low-surface energy material such as those functional groups. Also, the liquid crystal molecule is more stable entropically when it lies in parallel to long-chain compounds and enters clearances between these long chain compounds than when it exists in the state perpendicular to the long-chain compounds at the boundary where the long-chain compounds such as an alkyl group are oriented perpendicular to the boundary. Therefore, the liquid crystal is oriented perpendicularly at such a boundary. As the perpendicular aligning component, components such as an alkyl fluoride group which have both the surface energy effect and the exclusive volume effect are especially preferable.

Also, when the introduced amount of the perpendicular aligning component is too small, the effect of offsetting the horizontal orientation ability may become small, resulting in an unsatisfactory effect. A preferable amount may complicatedly vary depending on, for instance, tendency of horizontal orientation of the polymer (this is dependent not only on material properties but also on conditions of polymerization, crosslinking and drying process), the strength of the perpendicular aligning ability of the perpendicular aligning component, and the place where the liquid crystal molecule is introduced (the inside of the polymer or the boundary between the liquid crystal and the polymer). If the amount is too small, only insufficient effect is basically obtained. The perpendicular aligning component is, therefore, introduced preferably in an amount of approximately 0.1% by weight or more, and more preferably 1% by weight or more based on to the total weight of the polymer and the perpendicular aligning component.

In the case of utilizing a low-molecular component (including surfactants) as the perpendicular aligning component, the above amount to be introduced indicates the amount of functional groups (hydrophobic groups in the case of surfactants) which function as the perpendicular aligning component.

The perpendicular aligning component is preferably introduced at the boundary between the cholesteric liquid crystal and the polymer or in the polymer. Specific examples of a method of introducing such a perpendicular aligning component at the boundary between the cholesteric liquid crystal and the polymer or in the polymer include: (1) a method in which the perpendicular aligning component is mixed in the polymer and (2) a method in which the perpendicular aligning component is introduced as a part of the primary chain or a side chain of the polymer.

As to the method of mixing the perpendicular aligning component in the polymer, a low-molecular component such as silicone oil or fluorine grease is utilized by admixing it as the perpendicular aligning component in the polymer. However, because the perpendicular aligning component works at the boundary between the polymer and the liquid crystal and therefore, the perpendicular aligning component is preferably made to take the form of a surfactant with the positive intention of localizing it at the boundary. In other words, the perpendicular aligning component is desirably a surfactant.

The surfactant is a compound having a combination of a hydrophilic group and a hydrophobic group in one molecule. As the hydrophilic group, an ethylene oxide group, carboxylic acid group, sulfonic acid group and amino group may be preferably utilized. On the other hand, as the hydrophobic group, the perpendicular aligning components such as an alkyl group and alkyl halide group and particularly, a fluoroalkyl group may be preferably utilized.

Specific examples of the surfactant include lecithin, stearic acid, hexadecyltrimethylammonium bromide, octadecylmalonic acid, octadecylamine hydrochloride, alkylsilane (for example, hexamethyldisilazane), perfluoroalkyl/ethylene oxide adduct, perfluoroalkyl carboxylate and perfluoroalkyl aminosulfonate.

The surfactant is added in the cholesteric liquid crystal or in the polymer. It is preferable to select a polymer having a surface energy higher than that of the liquid crystal in order to localize the surfactant at the boundary between the polymer and the cholesteric liquid crystal and to orient the perpendicular aligning component such that it faces the liquid crystal side. Examples of such a polymer include a water-soluble polymer such as a polyvinyl alcohol, gelatin and alkyl cellulose; polyacryl resin; polyester resin; and epoxy resin.

In the above method of adding the perpendicular aligning component, some problems may arise such that the compatibility with the polymer is unsatisfactory, and the added perpendicular aligning component is dissolved in the cholesteric liquid crystal, whereby change in spiral pitch, reduction in transfer temperature and decrease of electric resistance may be caused. Therefore, it is necessary to select the combination of materials carefully.

On the other hand, the method explained below in which the perpendicular aligning component is introduced into a main chain (principal chain) or a side chain of the polymer has the advantage of preventing such problems. Preferable examples of such polymers into which the perpendicular aligning component is introduced in this manner include (1) fluororesins: for example, a polytetrafluoroethylene, tetrafluoroethylene/perfluoroalkylvinyl ether copolymer resin, ethylene-tetrafluoroethylene copolymer, perfluoroethylene-propene copolymer, polyvinylidene fluoride and ethylene-chlorotrifluoroethylene copolymer; (2) silicon-based resins: for example, a polysilane resin, polysilanylenephenylene resin, polysilanylenethienylene resin and silicone resin, and particularly, those having an alkyl group, allyl group or aralkyl group at its side chain; and (3) polymers in which a long-chain group such as an alkyl group, an alkyloxy group or an alkyl halide group having 4 or more carbon atoms is introduced into its side chain. As polymers of (3), an acryl resin, a polyester resin, a vinyl resin, an epoxy resin, an urethane resin, a polyimide resin, a polyamide resin and a polyolefin resin may be used.

The above resins of (1) and (2) may also be utilized as copolymers by combining them with other resins such as an epoxy resin and acryl resin. In this case, the surface energy of the copolymer is preferably made to be 30 dyne/cm or less. Alkyl fluoride groups obtained by substituting a part or all of hydrogen atoms of the alkyl group by fluorine atom(s) have both the surface energy effect and the exclusive volume effect, and are thus particularly preferable.

On the other hand, the cholesteric liquid crystal is a liquid-crystalline composition containing an optically active compound and may be obtained by, for example, (1) a method in which an optically active compound called a chiral compound or the like is added to a nematic liquid crystal composition or (2) a method using a liquid crystal composition containing a compound such as a cholesterol derivative which is itself optically active. In the former case, known nematic liquid crystal compositions such as a cyanobiphenyl type, phenylcyclohexane type, phenylbenzoate type, cyclohexylbenzoate type, azomethine type, azobenzene type, pyrimidine type, dioxane type, cyclohexylcyclohexane type, stilbene type and tolan type may be utilized. As the chiral agent, compounds having an optically active group such as cholesterol derivatives and 2-methylbutyl groups may be used.

Additives such as dyes and fine particles may be added to the cholesteric liquid crystal. Also, the cholesteric liquid crystal may be gelled using, for example, a crosslinking polymer or a hydrogen bonding gelling agent and may also be any of a high-molecular liquid crystal, middle-molecular liquid crystal and low-molecular liquid crystal or may be a mixture of these crystals. The spiral pitch of the cholesteric liquid crystal may vary depending on the type and amount of the chiral agent to be added and the material of the liquid crystal. The selective reflection wavelength may range in the visible wavelength region, or it may also range in the ultraviolet region or infrared wavelength region. The average particle diameter of cholesteric liquid crystal droplets dispersed in the polymer is preferably at least more than three times the spiral pitch of the cholesteric liquid crystal to exhibit stable memory storing characteristics.

The polymer/cholesteric liquid crystal dispersion of the invention serves to reduce the influence of the bent interface as explained in the above. Therefore, the state of the liquid crystal dispersion is not limited to a structure in which the liquid crystal is isolated and dispersed in the polymer, but the state can take a structure in which the cholesteric liquid crystals are communicated with each other to form a continuous phase, wherein the same effect can be exhibited. Also, the polymer/cholesteric liquid crystal dispersion of the invention may have a structure in which a microcapsule using the cholesteric liquid crystal as the core material and the polymer as the wall material is dispersed in another binder resin. In this case, the perpendicular aligning component may be introduced into the wall material of the microcapsule or the surface of the inside wall.

Examples of a method of producing the polymer/cholesteric liquid crystal dispersion include: (1) a microcapsule method using the cholesteric liquid crystal as the core material and the polymer as the wall material; (2) a dispersion drying method in which the cholesteric liquid crystal is dispersed in a polymer solution, such as an aqueous polyvinyl alcohol solution, which is incompatible with the cholesteric liquid crystal, followed by drying to remove the solvent; (3) a phase separation method in which the cholesteric liquid crystal and the polymer or a precursor of the polymer are mutually solubilized uniformly once by using heat or a solvent and external stimulation such as heat or light is applied to the solution to separate the polymer phase from the cholesteric liquid crystal phase; and (4) an impregnation method in which a network polymer structure is produced in advance and the structure is impregnated with the cholesteric liquid crystal.

As the phase separation method of (3), for example, (1) a solvent phase separation method in which the cholesteric liquid crystal and the polymer are mutually solubilized uniformly by using a co-solvent and the solution is reduced in the pressure to be applied thereto to vaporize the solvent, thereby carrying out phase separation, (2) a polymerization phase separation method in which a monomer or oligomer and the cholesteric liquid crystal are mutually solubilized and the solution enters into a crosslinking reaction by heat, light or electron rays to carry out phase separation by utilizing a reduction in compatibility which is caused by the crosslinking reaction and (3) a thermal phase separation method in which the cholesteric liquid crystal and the polymer are heated to dissolve the both mutually and then cooled to carry out phase separation may be utilized.

Each production method and a method of introducing the perpendicular aligning component will be explained in detail hereinbelow.

(1) Microcapsule Method

Examples of a method which may be utilized as the method of producing a microcapsule include: (1) a phase separation method in which an aqueous polymer solution in which the liquid crystal is dispersed is separated into two phases to form a film on the surface of a liquid crystal droplet; (2) an in-liquid drying method in which the polymer and the liquid crystal are dissolved in a common solvent and the solution is dispersed in a water phase, followed by vaporizing the solvent; (3) an interfacial polymerization method in which a mixed solution (oil phase solution) of the liquid crystal and an oil-soluble monomer A is dispersed in a water phase, to which is then added a water-soluble monomer B to run an interfacial reaction between the monomers A and B thereby forming a film; and (4) an in situ polymerization method in which a monomer is dissolved in the liquid crystal or a water phase and polymerized by heating or the like to precipitate a polymer, which is then used to form a film.

(Phase Separation Method)

In the phase separation method, a complex/coacervation method in which an aqueous solution of two types of water-soluble polymers such as a gelatin and gum arabic, protein and polysaccharide, protein and protein, protein and nucleic acid or polysaccharide and nucleic acid is separated into a concentrated phase and a dilute phase by controlling pH and temperature or a simple/coacervation method in which an organic solvent compatible with water such as alcohol or acetone is added in a water-soluble solution of a polymer such as a polyvinyl alcohol, gelatin or alkyl cellulose may be used.

Here, examples of a method which may be utilized as the method of introducing vertical orientation ability include: (1) a method in which a surfactant as the perpendicular aligning component is added in a water phase or oil phase; and (2) a method in which a precursor of the perpendicular aligning component which cause an addition reaction with a functional group of the wall-forming polymer is added in an oil phase in advance and an addition reaction is initiated by means of heating, addition of a catalyst, or the like after the above phase separation. An example of such a precursor is a compound having an alkyl group and/or alkyl halide group and a functional group such as a basic acid halide, haloformate, isocyanate, isothiocyanate, ketene, carbodiimide, epoxy, glycidyl ether, oxazoline, ethyleneimine, lactone or aldehyde.

(In-liquid Drying Method)

In the in-liquid drying method, for example, a method may be utilized in which a polymer into which the perpendicular aligning component is introduced at its main chain (principal chain) or side chain is dissolved together with the liquid crystal in a low-boiling point solvent and the mixture is dispersed in water, followed by reducing the pressure or by heating to vaporize the solvent. As the polymer and the solvent, combinations of a fluororesin and a fluorine type solvent such as fleon and an acryl resin, urethane resin or polyester resin into which an alkyl group or alkyl halide group is introduced and methylene chloride may be utilized.

(Interfacial Polymerization Method)

In the interfacial polymerization method, as the oil-soluble monomer A, polyvalent compounds having plural functional groups such as a basic acid halide, haloformate, isocyanate, isothiocyanate, ketene, carbodiimide, epoxy, glycidyl ether, oxazoline, ethyleneimine or lactone may be utilized. As the water-soluble monomer B, polyvalent compounds having plural functional groups such as an amine, alcohol, carboxylic acid, mercaptan or phenol may be utilized.

Here, the following methods may be applied to introduce the vertical orientation ability: (1) a method in which a surfactant as the perpendicular aligning component is added in a water phase or in an oil phase; (2) a method in which a precursor of the perpendicular aligning component which causes an addition reaction with the oil-soluble monomer A (an example of such a precursor is a compound having an alkyl group and/or an alkyl halide group and a functional group such as an amine, glycol, carboxylic acid or mercaptan) is allowed to enter into an addition reaction with the oil-soluble monomer A in advance and is then mixed with the liquid crystal and the mixture is dispersed in water and then allowed to enter into polymerization reaction with the water-soluble monomer B; (3) a method in which a precursor of the perpendicular aligning component which causes an addition reaction with the oil-soluble monomer A is mixed with the oil-soluble monomer A and the liquid crystal and the mixture is dispersed in water and then allowed to enter into polymerization reaction and addition reaction with the water-soluble monomer B to provide vertical orientation ability; and (4) a method in which a precursor of the perpendicular aligning component which is to enter into an addition reaction with the oil-soluble monomer B (an example of such a precursor is a compound having an alkyl group and/or alkyl halide group and a functional group such as a basic acid halide, haloformate, isocyanate, isothiocyanate, ketene, carbodiimide, epoxy, glycidyl ether, oxazoline, ethyleneimine and lactone) is mixed with the oil-soluble monomer A and the liquid crystal, the mixture is dispersed in water and then the water-soluble monomer B is added to the dispersion solution to carry out interfacial polymerization and to introduce the polymer into the wall material. An organic solvent such as toluene, ethyl acetate or methylene chloride may be added to the oil phase to aid mutual solubility of the liquid crystal, the oil-soluble monomer A and the perpendicular aligning component among them.

(In-Situ Polymerization Method)

The in-situ polymerization method is carried out using, for example, (1) a method in which the oil-soluble monomer A is polymerized with the monomer C or (2) a method utilizing the monomer D such as radically polymerizable monomers which are homo-polymerizable. In the case of the method (1), the monomer A described in the paragraph "Interfacial polymerization method" may be similarly used as the monomer A. Polyvalent compounds having plural functional groups such as a basic acid halide, haloformate, isocyanate, isothiocyanate, ketene, carbodiimide, epoxy, glycidyl ether, oxazoline, ethyleneimine or lactone in one molecule may be utilized as the oil-soluble monomer A. Polyvalent compounds having plural functional groups such as an amine, alcohol, carboxylic acid, mercaptan and phenol in one molecule may be utilized as the monomer C. In the case of (2), a polyvalent epoxy compound, polyvalent isocyanate compound or unsaturated hydrocarbon compound such as styrene, isoprene, butadiene, vinyl chloride, vinylidene chloride, acrylonitrile, acrylic acid derivative or methacrylic acid derivative may be utilized as the monomer D. Also, the wall material may be formed from the water phase. In this case, a water-soluble monomer such as melamine/formaldehyde may be used.

Here, examples of a method utilized to introduce the perpendicular aligning component may include: (1) a method in which a surfactant as the perpendicular aligning component is added in the water phase or oil phase; (2) a method in which a precursor of the perpendicular aligning component which causes an addition reaction with the oil-soluble monomer A or the monomer C (an example of such a precursor is a compound having an alkyl group and/or alkyl halide group and a functional group such as a basic acid halide, haloformate, isocyanate, isothiocyanate, ketene, carbodiimide, epoxy, glycidyl ether, ethyleneimine, lactone, amine, glycol, carboxylic acid or mercaptan) is made to enter into an addition reaction with the oil-soluble monomer A or the monomer C in advance and the reaction mixture is then dispersed in water and polymerized; (3) a method in which a mixed solution of a precursor of the perpendicular aligning component which enters into an addition reaction with the oil-soluble monomer A or the monomer C, the monomer A, the monomer C and the liquid crystal is dispersed in water to run polymerization and an addition reaction simultaneously; and (4) a method in which a mixed solution of a precursor of the perpendicular aligning component which causes an addition reaction with monomer D (an example of such a precursor is a compound having an alkyl group and/or an alkyl halide group and an unsaturated hydrocarbon group), monomer D and the liquid crystal is dispersed in water to run a polymerization reaction and an addition reaction simultaneously.

(2) Dispersion Drying Method

In the dispersion drying method, water-soluble polymers, such as a polyvinyl alcohol, alkyl cellulose and gelatin, which have low compatibility with the cholesteric liquid crystal and low swelling characteristics are used as the polymer. The polymer/cholesteric liquid crystal dispersion is obtained by, first, dispersing the cholesteric liquid crystal in an aqueous solution of the above water-soluble polymer and by then applying the solution to a substrate, followed by drying to eliminate water.

Here, examples of a method utilized to introduce the perpendicular aligning component may include: (1) a method in which a surfactant as the perpendicular aligning component is added in the liquid crystal or water; (2) a method in which an alkyl group or an alkyl halide group is introduced in advance into the side chain or terminal of the water-soluble polymer; and (3) a method in which a reactive perpendicular aligning component including a compound such as a polyvalent basic acid halide, haloformate, isocyanate, isothiocyanate, ketene, carbodiimide, epoxy, glycidyl ether, oxazoline, ethyleneimine or lactone having an alkyl group or alkyl halide group, is added in the liquid crystal in advance and reacted with a functional group of the above water-soluble polymer by heating at the time of application and drying.

(3) Phase Separation Method (Solvent Phase Separation Method)

In the solvent phase separation method, a method may be utilized in which (1) a solution obtained by dissolving a surfactant as the perpendicular aligning component, the polymer and the liquid crystal in a co-solvent or (2) a solution obtained by dissolving the polymer into which the perpendicular aligning component is introduced at the primary chain or side chain and the liquid crystal in a co-solvent is prepared and applied to a substrate, followed by vaporizing the solvent to obtain a polymer/cholesteric liquid crystal dispersion. As the polymer and the solvent, the same materials that are used in the case of the in-liquid drying method of a microscope may be utilized. However, the drying is carried out in a gas phase in the method of this case, and there is therefore the case where a solvent is vaporized at a high rate and the particle diameter is too small. Therefore, a solvent having a higher-boiling point and lower vapor pressure may be used.

(Polymerization Phase Separation Method)

In the polymerization phase separation method, monomers usable in the in-situ polymerization method may be similarly utilized. As a method of introducing the perpendicular aligning component, (1) a method in which a surfactant as the perpendicular aligning component is added in a solution in which a monomer and the liquid crystal are dissolved and (2) a method in which a precursor of the perpendicular aligning component which is to enter into an addition reaction with a functional group of the polymer forming the wall material (an example of such a precursor is a compound having an alkyl group and/or alkyl halide group and a functional group such as a basic acid halide, haloformate, isocyanate, isothiocyanate, ketene, carbodiimide, epoxy, glycidyl ether, oxazoline, ethyleneimine, lactone and aldehyde) is mixed with a monomer and the liquid crystal, the mixture is applied or injected into a cell, followed by running a polymerization reaction to carry out phase separation and to allow the polymer to run an addition reaction simultaneously.

(Thermal Phase Separation Method)

In the thermal phase separation method, for example, (1) a method in which a surfactant as the vertical orientation agent is added to a fused solution of the polymer and the liquid crystal and (2) a method in which the polymer in which the perpendicular aligning component is introduced into the side chain or main chain (principal chain) and the liquid crystal are dissolved and mixed may be used. In the case of (1), as the polymer, a thermoplastic resin such as a polyvinylbutyral, ethylene/vinyl acetate copolymer, ethylene/vinyl chloride copolymer, vinyl chloride/vinyl acetate copolymer, polyester and modifications of these compounds may be utilized. In the case of (2), materials obtained by modifying the polymer described in the above (1) is modified by the perpendicular aligning component is utilized as the polymer.

(4) Impregnation Method

In the impregnation method, the perpendicular aligning component may be introduced by a method in which the surface of a porous polymer is modified using a surfactant or a reactive perpendicular aligning component or a method in which a fluororesin or silicon resin is fused with the polymer to form a porous polymer.

When a polymer, other than polymers including water-soluble resins, fluororesins and silicon resins which are less soluble in the liquid crystal, is used in the above production method, the polymer is preferably crosslinked to prevent swelling and dissolution caused by the liquid crystal.

The polymer/cholesteric liquid crystal dispersion of the invention may be produced by various methods as mentioned above. Particularly, the microcapsulated polymer/cholesteric liquid crystal dispersion has the characteristics that it can be dispersed in a binder resin and applied to various surfaces upon use, other functional layers may be formed on the coating because the liquid crystal is protected by a wall material and it is superior in mechanical strengths such as resistances to pressure and bending, and it therefore has a wide range of applications.

Here, the microcapsule of the cholesteric liquid crystal may be produced by various production methods as mentioned above. Among these production methods, the cholesteric liquid crystal microcapsule using, as the wall material, a polyvalent isocyanate polymer to which an alkyl group and/an alkyl halide group are added as the perpendicular aligning component gives a high display contrast and is therefore particularly preferable.

As the polyvalent isocyanate, tolylenediisocyanate, diphenylmethanediisocyanate, xylenediisocyanate, 1,3-bis(isocyanatemethyl)cyclohexane, hexamethylenediisocyanate, norbornanediisocyanate, an adduct or trimer of these isocyanates, and one polymerized by a burett reaction or allophanate reaction may be utilized. Also, the number of NCO groups in one molecule is preferably large because a higher contrast is obtained. This is considered to be because a higher crosslinking density more strengthen the orientation of the main chain (principal chain) of the polymer due to shrinkage stress and this more strengthens the vertical orientation ability of the side-chain alkyl group or alkyl halide group added perpendicular to the main chain (principal chain). As to the alkyl group and alkyl halide group, the number of carbons is preferably 4 or more and fluorine is particularly preferable as the halogen from the viewpoint of providing high vertical orientation ability.

The polyvalent isocyanate reacts with water into a carbamic acid which enters into an addition reaction with other isocyanate molecules. This is explained as an interfacial polymerization reaction with water. Because a monomer can be polymerized without adding the monomer in a water phase, the polymer can be produced in the same manner as in the in-situ polymerization method. As regards a method of introducing the perpendicular aligning component, a polyvalent isocyanate is added to an oil phase together with a compound having an alkyl group or alkyl halide group, and a functional group which enters into an addition reaction with the above polyvalent isocyanate: for example, isocyanate, isothiocyanate, ketene, carbodiimide, epoxy, glycidyl ether, ethyleneimine, lactone, amine, alcohol and the like and the mixture is heated to run an addition reaction.

A method of producing the microcapsule of a cholesteric liquid crystal using a polymer of a polyisocyanate as the wall material involves a dispersing step of dispersing a mixed solution containing the cholesteric liquid crystal, the polyvalent isocyanate and the precursor of the perpendicular aligning component having a functional group which enters into an addition reaction with the polyvalent isocyanate and an alkyl group and/or alkyl halide group in one molecule in water and a polymerization step of polymerizing the polyvalent isocyanate and microcapsulating the cholesteric liquid crystal by using the polymer as the wall material.

If a polyvalent amine is further added as the structural component of the wall material, a higher contrast can be obtained. As the polyvalent amine, ethylenediamine, diethylenetriamine, triethylenetetramine, tetraethylenepentamine, hexamethylenediamine, polyallylamine or polyethyleneimine may be utilized. Particularly, a polyallylamine gives a high contrast and is therefore preferable. The polyallylamine has a large number of functional groups in one molecule and can therefore raise crosslinking density significantly. It is therefore considered that the horizontal orientation ability of the polymer main chain (principal chain) is more intensified, so that the vertical orientation ability of an alkyl group or alkyl halide group which is a side chain is intensified. Because the above polyvalent amine is soluble in water, it may be added to water in the above polymerization step to run a polymerization reaction with the polyvalent isocyanate, thereby carrying out interfacial polymerization.

The polymer/cholesteric liquid crystal dispersion of the invention is applied to a substrate by using a printing method such as screen printing, relief-printing, intaglio printing, planographic printing and flexography, or a coating method such as a spin coating method, bar coating method, dip coating method, roll coating method, knife coating method and die coating method to utilize.

The polymer/cholesteric liquid crystal dispersion of the invention may be utilized in, for example, display elements, image and information recording elements and space optical modulators. It is particularly preferable to utilize it for display elements, specifically, liquid crystal display elements. The liquid crystal display element of the invention will be hereinafter explained.

Figure 5:
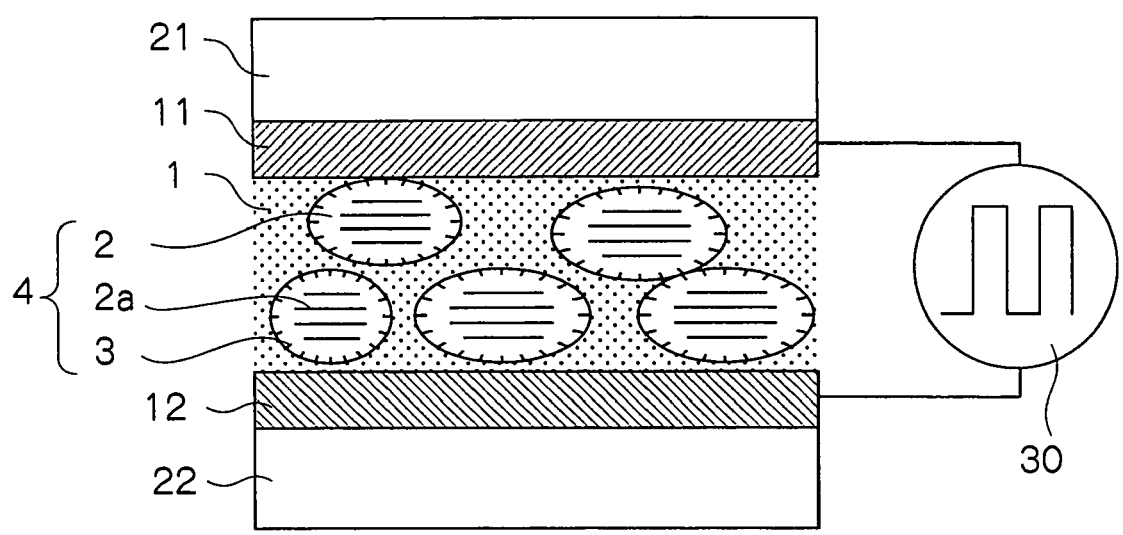
FIG. 5 is a schematic structural view illustrating a liquid crystal display element using a polymer/cholesteric liquid crystal dispersion of the present invention.

The liquid crystal display element of the invention has a structure in which the polymer/cholesteric liquid crystal dispersion of the invention is sandwiched between a pair of electrodes. Specifically, as shown in FIG. 5, the liquid crystal display element may have, for example, a structure in which the above polymer/cholesteric liquid crystal dispersion 4 of the invention in which a cholesteric liquid crystal 2 is dispersed in a polymer 1 is sandwiched between substrates 21 and 22 provided with electrodes 11 and 12 respectively, where a voltage pulse is given by a drive circuit 30 to display. In FIG. 5, 2a represents a cholesteric liquid crystal layer, 3 represents a perpendicular aligning component. An optical absorbing member may be disposed as a display background between the polymer/cholesteric liquid crystal dispersion 4 and the electrode 12 or on the backside of the substrate 22. As these substrates 21 and 22, for example, glass or resins (transparent dielectrics such as polyethylene terephthalate, polyether sulfone, polycarbonate and polyolefin) may be used. As the electrodes 11 and 12, for example, a transparent conductive film such as indium oxide tin alloy and zinc oxide may be used.

In the liquid crystal display element of the invention, the above polymer/cholesteric liquid crystal dispersion of the invention makes conspicuous an optical difference between the P orientation and the F orientation in the memory state of the cholesteric liquid crystal. Therefore, as the display mode, a scattering-transmission mode utilizing a difference in light-scattering strength between the P orientation and the F orientation, optical rotation mode utilizing the angle of rotation or birefringence mode utilizing a difference in birefringence besides the selective reflection mode described until now may be utilized. In this case, a polarizing plate or a phase plate may be combined as an auxiliary member. Also, a dichroism dye may be added in the liquid crystal to display in a guest-host mode.

As a method of driving the liquid crystal display element of the invention, known methods such as those shown below may be applied. These known methods include: (1) a segment drive method in which a liquid crystal element is sandwiched between electrodes patterned into a display form to drive it; (2) a simple matrix drive method in which a polymer/cholesteric liquid crystal dispersion is sandwiched between a pair of stripe electrode substrates disposed perpendicular to each other to carry out line sequential scanning to thereby write an image; (3) an active matrix drive method in which an active element such as a thin-film transistor, thin-film diode or MIM (metal-insulator-metal) element is disposed in each pixel to drive the liquid crystal display element through these active elements; (4) an optical drive method in which a liquid crystal display element is laminated on a light conductor and a laminate is sandwiched between a pair of electrodes to write an image by applying voltage while projecting an optical image; (5) a thermal drive method in which a polymer/cholesteric liquid crystal dispersion sandwiched between a pair of electrodes is allowed to transit to the P orientation by applying voltage and then heated to more than the phase transition temperature by using a laser or a thermal head to write an image; and (6) an electrostatic drive method in which a polymer/cholesteric liquid crystal dispersion is applied to an electrode substrate to write an image by using a stylus head or ion head.

EXAMPLES

The present invention will be explained in more detail by way of examples. However, the following Examples should not be construed to limit the scope of the invention.

Example 1

84 Parts of nematic liquid crystal E7 (manufactured by Merck Co., Ltd.), 12.8 parts of chiral agent R811 (manufactured by Merck Co., Ltd.) and 3.2 parts of chiral agent R1011 (manufactured by Merck Co., Ltd.) are mixed to obtain 100 parts of a cholesteric liquid crystal which selectively reflects light having a wavelength of 550 nm. This cholesteric liquid crystal, one part of Takenate D-110N (manufactured by Takeda Chemical Industries, Ltd.) as a polyvalent isocyanate and one part of dodecylisocyanate as a precursor of a perpendicular aligning component are dissolved in 1000 parts of ethyl acetate to prepare an oil phase composition. This composition is poured into 10,000 parts of an aqueous 1% polyvinyl alcohol solution, which is then stirred and dispersed to produce an o/w emulsion having a particle diameter of about 7 μm.

To the solution is added 100 parts of an aqueous 10% polyallylamine (manufactured by Nitto Boseki Co., Ltd.) and the mixture is heated at 70° C. for 2 hours to produce a microcapsule using a polyurethane as its wall material. After the microcapsules are precipitated by centrifugation and recovered, an aqueous polyvinyl alcohol solution is added to the microcapsules to make a microcapsule liquid crystal paint, in which the ratio by weight of a dodecyl group as the perpendicular aligning component to the sum of the precursor of the perpendicular aligning component, the polyvalent isocyanate and the amine is 6.7%.

Next, the above microcapsule liquid crystal paint is applied to a commercially available ITO deposition PET resin film by an applicator in a dry film thickness of 30 μm. An aqueous polyvinyl alcohol solution in which carbon black is dispersed is applied to the above paint film in a dry thickness of 3 μm to form a light absorbing layer. On the other hand, another ITO deposition PET resin film is prepared. A two-solution urethane type adhesive is applied to the PET resin film in a dry thickness of 3 μm and the above substrate coated with the display layer is applied to the adhesive to prepare a sample of a polymer/cholesteric liquid crystal dispersion.

Symmetrical rectangular wave pulses having a length of 200 ms and a frequency of 1 KHz are applied between the upper and lower electrodes of the above sample of the polymer/cholesteric liquid crystal dispersion to measure reflectance three seconds after the pulses are applied. The above measurement is repeated under different voltages to measure voltage-reflectance characteristic. The ratio of the maximum reflectance to the minimum reflectance in the voltage-reflectance characteristic is defined as contrast ratio. The contrast ratio of the above sample of the polymer/cholesteric liquid crystal dispersion is measured to find that the contrast ratio is 2.7.

Example 2

A sample is manufactured in the same manner as in Example 1 except in that glycidyl hexadecyl ether is used as the precursor of the perpendicular aligning component. The ratio by weight of a hexadecyl group as the perpendicular aligning component based on the sum of the precursor of the perpendicular aligning component, the polyvalent isocyanate and the polyallylamine is 6.3%. The contrast ratio of this sample is 3.2.

Example 3

A sample is manufactured in the same manner as in Example 1 except in that glycidyl 2,2,3,3,4,4,5,5,6,6,7,7,8,8,9,9-hexadecafluorononyl ether is used as the precursor of the perpendicular aligning component. The ratio by weight of the hexadecafluorononyl group as the perpendicular aligning component based on the sum of the precursor of the perpendicular aligning component, the polyvalent isocyanate compound and the polyallylamine is 7.1%. The contrast ratio of this sample is 2.9.

Example 4

A sample is manufactured in the same manner as in Example 1 except in that glycidyl 4-nonylphenyl ether is used as the precursor of the perpendicular aligning component. The ratio by weight of the nonyl group as the perpendicular aligning component based on the sum of the precursor of the perpendicular aligning component, the polyvalent isocyanate compound and the polyallylamine is 6.1%. The contrast ratio of this sample is 4.7.

Example 5

84 Parts of nematic liquid crystal E7 (manufactured by Merck Co., Ltd.), 12.8 parts of chiral agent R811 (manufactured by Merck Co., Ltd.) and 3.2 parts of chiral agent R1011 (manufactured by Merck Co., Ltd.) are mixed to obtain 100 parts of a cholesteric liquid crystal which selectively reflects light having a wavelength of 550 nm.

0.5 Parts of perfluorooctanesulfonic acid as a surfactant containing a perpendicular aligning component is dissolved in 100 parts of an aqueous 10% polyvinyl alcohol solution, into which 20 parts of the above cholesteric liquid crystal is poured. The mixture is stirred and dispersed by a mixer to manufacture an o/w emulsion having a particle diameter of approximately 8 μm. This o/w emulsion is applied to a commercially available ITO deposition PET resin film by an applicator in a dry thickness of 30 μm to manufacture a display layer by a dispersion drying method.

An aqueous polyvinyl alcohol solution in which carbon black is dispersed is applied to the above display layer in a dry thickness of 3 μm to form a light absorbing layer. On the other hand, another ITO deposition PET resin film is prepared. A two-solution urethane type adhesive is applied to the PET resin film in a dry thickness of 3 μm and the above substrate coated with the display layer is applied to the adhesive to prepare a sample of a polymer/cholesteric liquid crystal dispersion.

The ratio by weight of the perfluorooctane group as the perpendicular aligning component to the sum of the polyvinyl alcohol and perfluorooctanesulfonic acid is 4.0%. The contrast ratio of this sample is 5.0.

mercially available ITO deposition PET resin film by an applicator in a dry thickness of 30 μm to manufacture a display layer.

On the other hand, another ITO deposition PET resin film is coated with an aqueous polyvinyl alcohol solution in which carbon black is dispersed such that a dry film thickness is 3 μm, to form a light absorption layer. This film is thermally stuck under pressure to the above film formed with the display layer.

The resulting product is heated to 120° C. in an oven to dissolve the polyvinylbutyral resin and the cholesteric liquid crystal uniformly, and then, the temperature of the system is dropped at a rate of 0.5° C./min to carry out thermal phase separation of cholesteric liquid crystal droplets having a diameter of several micron-meters. A sample of a polymer/cholesteric liquid crystal dispersion is manufactured in this manner.

The ratio by weight of the perfluorohexyl group as the perpendicular aligning component to the sum of the polyvinylbutyral resin and 3-(2-perfluorohexylethoxy)-1,2-dihydroxypropane is 3.5%. The contrast ratio of this sample is 3.3.

Comparative Example 1

A sample is manufactured in the same manner as in Example 1 except in that the precursor of the perpendicular aligning component is not added. The contrast ratio of this sample is 2.1.

Here, the results of Examples 1 to 6 and Comparative Example 1 are described collectively in Table 1. The contrast ratio of each Example is higher than that of Comparative Example, to confirm the improved effect of the invention.

TABLE 1

| | Perpendicular aligning component (its precursor) | Style of introduction of perpendicular aligning component | Liquid crystal form | Contrast ratio |
|---|---|---|---|---|
| Example 1 | Dodecylisocyanate | Introduced as a functional group into a capsule wall material | Microcapsule form | 2.7 |
| Example 2 | Glycidyl hexadecyl ether | Introduced as a functional group into a capsule wall material | Microcapsule form | 3.2 |
| Example 3 | Glycidyl 2,2,3,3,4,4,5,5,6,6,7,7,8,8,9,9 hexadecafluorononyl ether | Introduced as a functional group into a capsule wall material | Microcapsule form | 2.9 |
| Example 4 | Glycidyl 4-nonylphenyl ether | Introduced as a functional group into a capsule wall material | Microcapsule form | 4.7 |
| Example 5 | Perfluorooctanesulfonic acid | Introduced by mixing as a surfactant in the polymer | Dispersed liquid droplets | 5.0 |
| Example 6 | 3-(2-perfluorohexylethoxy)-1,2-dihydroxypropane | Introduced by mixing as a low-molecular compound in the polymer | Thermal phase separation form | 3.3 |
| Comparative Example 1 | None | — | Microcapsule form | 2.1 |

Example 6

84 Parts of nematic liquid crystal E7 (manufactured by Merck Co., Ltd.), 12.8 parts of chiral agent R811 (manufactured by Merck Co., Ltd.) and 3.2 parts of chiral agent R1011 (manufactured by Merck Co., Ltd.) are mixed to obtain 100 parts of a cholesteric liquid crystal which selectively reflects light having a wavelength of 550 nm.

10 Parts of the above cholesteric liquid crystal, 10 parts of a polyvinylbutyral resin and 0.5 parts of 3-(2-perfluorohexylethoxy)-1,2-dihydroxypropane are dissolved in an appropriate amount of chloroform. This solution is applied to a com-

Example 7

A sample is manufactured in the same manner as in Example 3 except in that the amount of the polyvalent isocyanate is changed to 1, 2 and 5 parts. The ratios by weight of the hexadecafluorononyl group as the perpendicular aligning component to the sum of the precursor of the perpendicular aligning component, the polyvalent isocyanate and polyallylamine are 6.5%, 5.3% and 4.0%. The contrast ratios of these samples are 5.9, 12.4 and 30.3 and along with an increase in the amount of the polyvalent isocyanate to be added, a more significant improvement in the contrast is seen in this Example as compared to Comparative Example.

Figure 6:
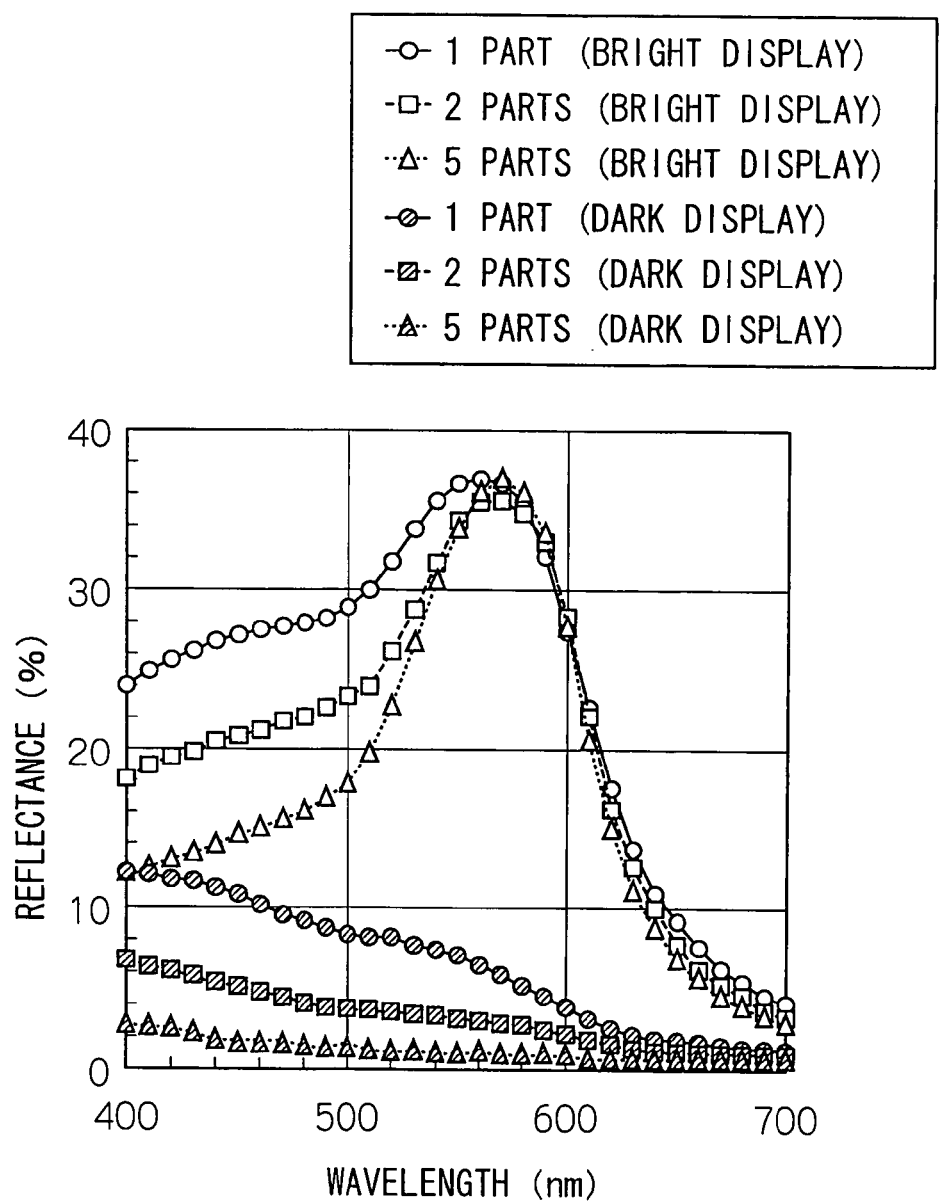
FIG. 6 is a view illustrating the reflection spectrum of the polymer/cholesteric liquid crystal dispersion obtained in Example 7.
Figure 7:
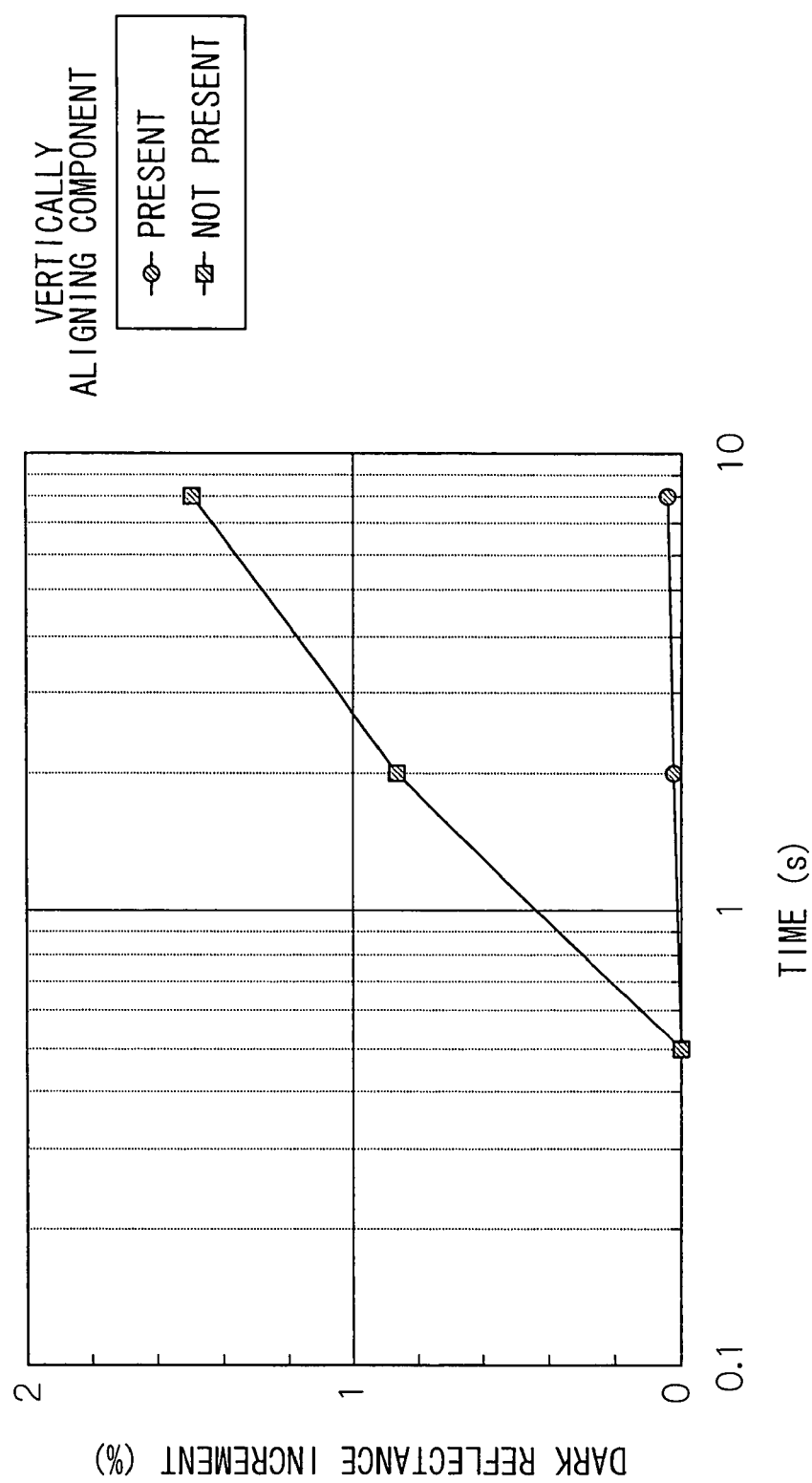
FIG. 7 is a view illustrating the dark reflectance of the polymer/cholesteric liquid crystal dispersion obtained in Example 7 with respect to time.
Figure 8:
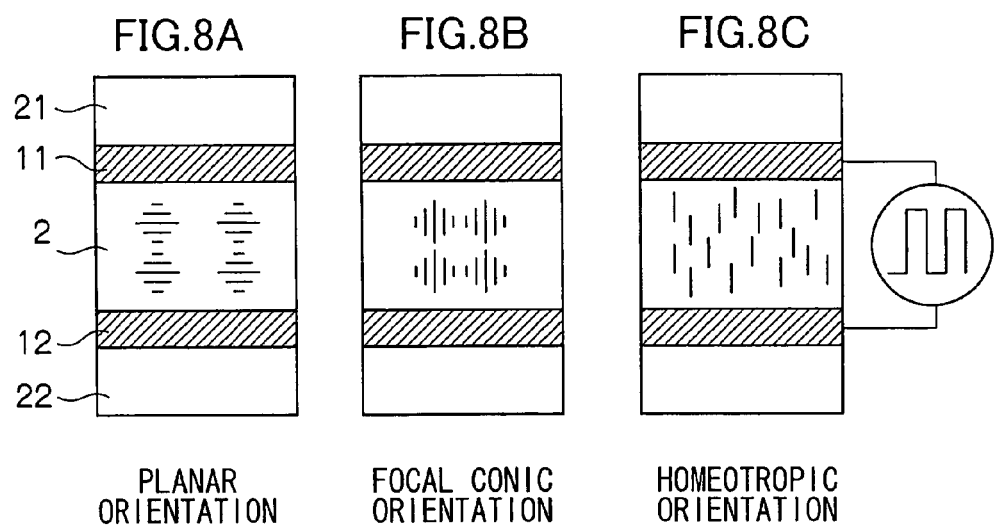
FIGS. 8A, 8B and 8C are views for explaining the oriented state of a cholesteric liquid cell.
Figure 9:
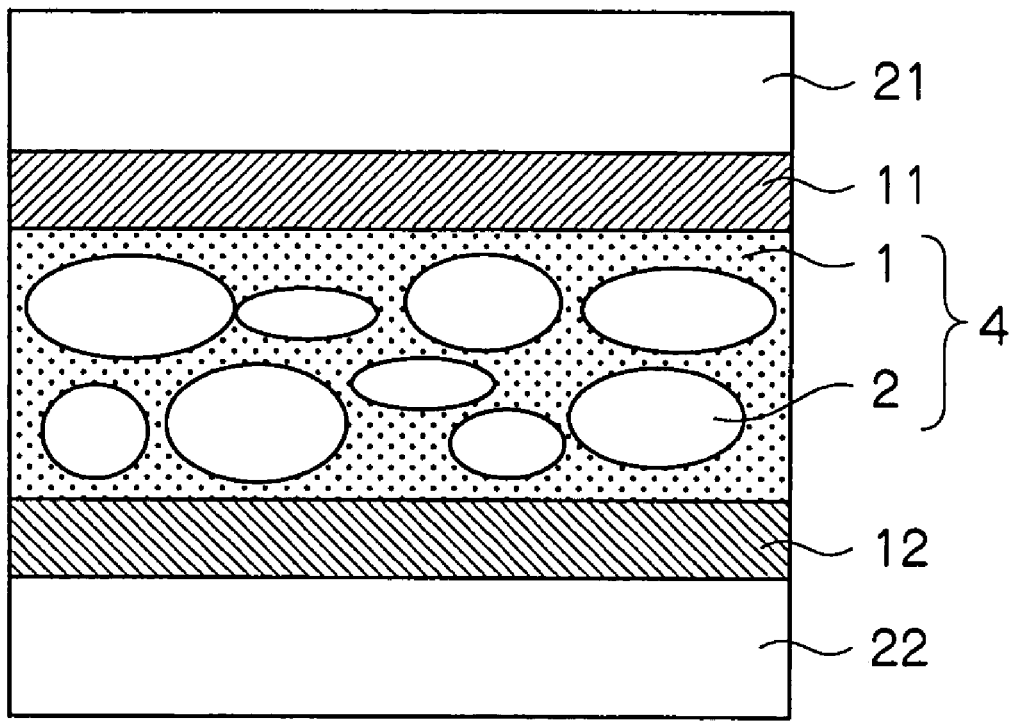
FIG. 9 is a schematic structural view of a liquid crystal display element utilizing a conventional polymer/cholesteric liquid crystal dispersion.
Figure 10:
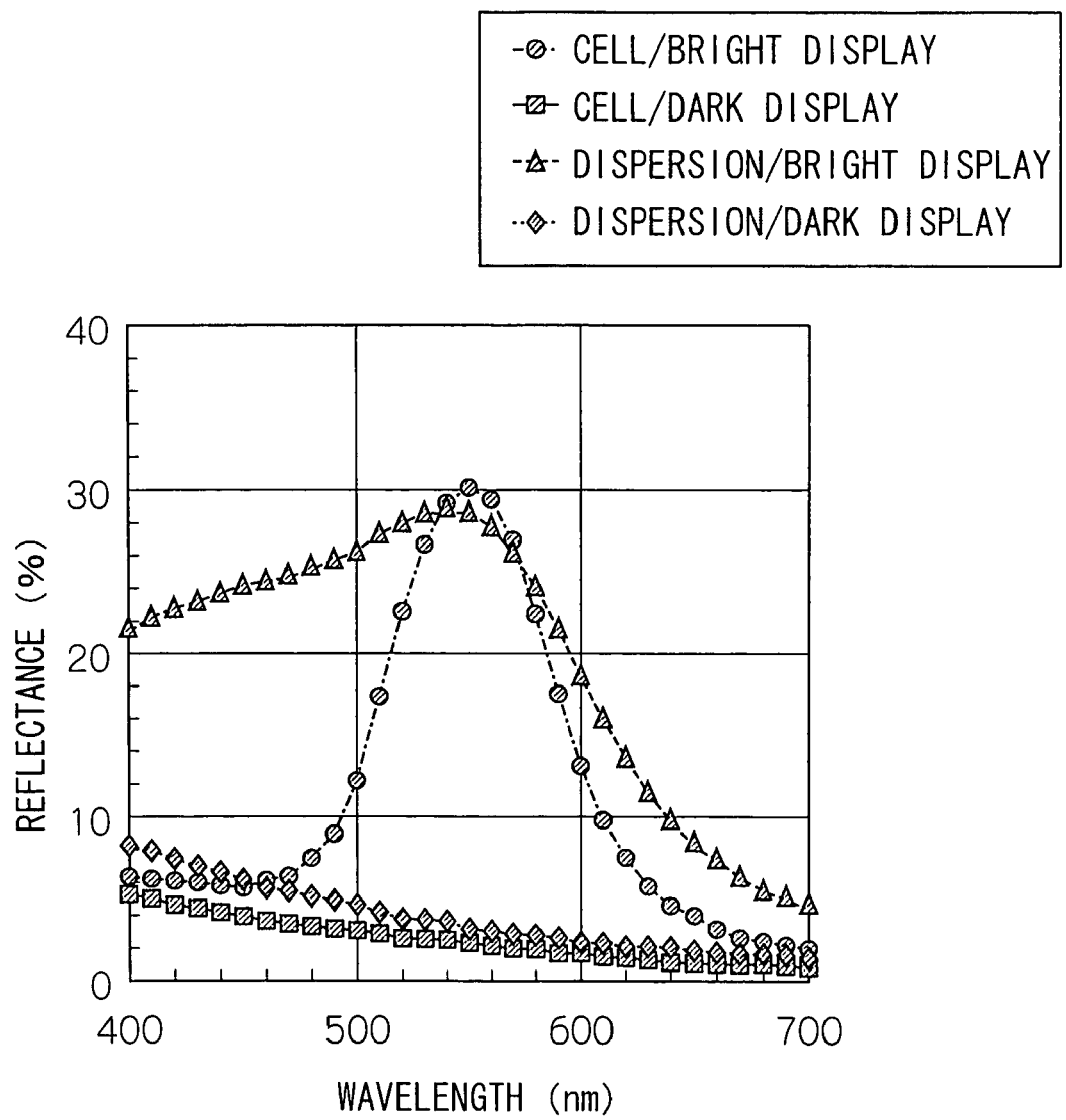
FIG. 10 is a view illustrating the relation between the reflection spectrum of a conventional polymer/cholesteric liquid crystal dispersion and the reflection spectrum of a liquid crystal cell.

The reflection spectrums of the samples at the time of a bright display and at the time of a dark display are shown in FIG. 6. Along with an increase in the amount to be added, the short-wavelength component at the time of a bright display is reduced, which makes it possible to obtain a polymer/cholesteric liquid crystal dispersion having high color purity. FIG. 7 illustrates the reflectance changes during a dark display (dark reflectance), with respect to time, of the sample of Comparative Example (when perpendicular aligning component is not present) and the samples of the present invention (when perpendicular aligning component is present) in which the amount of the polyvalent isocyanate is 5 parts. In the case where no perpendicular aligning component exist, there is a significant rise in the dark reflectance, whereas in the case where the perpendicular aligning component exists, the dark reflectance is not substantially changed and is stable.

It is to be noted that another investigation makes it clear that the hardness of the wall material of the microcapsule is increased and the shape of the microcapsule in the dry coating is changed to a shape close to a true sphere from a crushed sphere. This suggests an increase in tension in the inside of the wall material. It is considered from this suggestion that crosslinking density increases along with an increase in the amount of the polyvalent isocyanate to be added, shrinkage stress caused by the raised crosslinking density forces the polymer main chain (principal chain) to orient horizontally in the wall material and the perpendicular aligning component orients perpendicular to the polymer main chain (principal chain), so that the perpendicular aligning ability is promoted, resulting in the improvements in the stability of contrast, reflective spectrum and reflectance.

What is claimed is:

1. A cholesteric liquid crystal dispersion comprising a cholesteric liquid crystal dispersed in a polymer, wherein a perpendicular aligning component that aligns the cholesteric liquid crystal in a direction perpendicular to a boundary between the cholesteric liquid crystal and the polymer is provided at least one of at the boundary between the cholesteric liquid crystal and the polymer and in the polymer.

2. The cholesteric liquid crystal dispersion of claim 1, wherein the perpendicular aligning component comprises at least one selected from the group consisting of a fluorine atom, a silicon atom, an alkyl group and an alkyl halide group.

3. The cholesteric liquid crystal dispersion of claim 1, wherein the perpendicular aligning component is contained in the at least one of the boundary between the cholesteric liquid crystal and the polymer in an amount of approximately 0.1% by weight or more based on the total weight of the polymer and the perpendicular aligning component.

4. The cholesteric liquid crystal dispersion of claim 2, wherein the perpendicular aligning component is contained in the at least one of the boundary between the cholesteric liquid crystal and the polymer in an amount of approximately 0.1% by weight or more based on the total weight of the polymer and the perpendicular aligning component.

5. The cholesteric liquid crystal dispersion of claim 4, wherein the perpendicular aligning component comprises an alkyl fluoride group.

6. The cholesteric liquid crystal dispersion of claim 1, wherein the perpendicular aligning component is provided in a main chain or a side chain of the polymer.

7. The cholesteric liquid crystal dispersion of claim 1, wherein the perpendicular aligning component is mixed in the polymer.

8. The cholesteric liquid crystal dispersion of claim 1, wherein the perpendicular aligning component is a surfactant comprising a hydrophilic group and a hydrophobic group.

9. The cholesteric liquid crystal dispersion of claim 8, wherein the hydrophobic group comprises at least one selected from an alkyl group and an alkyl halide group.

10. The cholesteric liquid crystal dispersion of claim 9, wherein the perpendicular aligning component comprises an alkyl fluoride group.

11. The cholesteric liquid crystal dispersion of claim 1, wherein the cholesteric liquid crystal is microcapsulated by using the polymer as a wall material.

12. The cholesteric liquid crystal dispersion of claim 1, wherein the polymer is polymerized with a polyvalent isocyanate, and at least one selected from an alkyl group and an alkyl halide group is introduced to the polymer as the perpendicular aligning component.

13. The cholesteric liquid crystal dispersion of claim 12, wherein the perpendicular aligning component comprises an alkyl fluoride group.

14. The cholesteric liquid crystal dispersion of claim 1, wherein the polymer is copolymerized with a polyvalent isocyanate and a polyvalent amine, and at least one selected from an alkyl group and an alkyl halide group is introduced to the polymer as the perpendicular aligning component.

15. The cholesteric liquid crystal dispersion of claim 14, wherein the perpendicular aligning component comprises an alkyl fluoride group.

16. A method of producing a cholesteric liquid crystal dispersion, the method comprising:
    dispersing in water a mixed solution of a cholesteric liquid crystal, a polyvalent isocyanate, a perpendicular aligning component precursor comprising, in a molecule, a functional group which causes an addition reaction with the polyvalent isocyanate and at least one selected from an alkyl group and an alkyl halide group; and
    polymerizing the polyvalent isocyanate to form a polymer so as to microcapsulate the cholesteric liquid crystal by using the polymer as a wall material.

17. The method of claim 16, wherein, in the polymerizing of the polyvalent isocyanate, a polyvalent amine is added in the water to cause interfacial polymerization between the polyvalent amine and the polyvalent isocyanate.

18. A liquid crystal display element comprising a pair of electrodes and the cholesteric liquid crystal dispersion of claim 1 sandwiched between the pair of electrodes.

* * * * *